UNITED STATES PATENT OFFICE.

BERTRAM MAYER, OF BASEL, SWITZERLAND, ASSIGNOR TO SOCIETY OF CHEMICAL INDUSTRY IN BASLE, OF BASEL, SWITZERLAND.

GREEN VAT DYESTUFFS AND PROCESS OF MAKING SAME.

1,097,343. Specification of Letters Patent. Patented May 19, 1914.

No Drawing. Application filed June 3, 1913. Serial No. 771,535.

*To all whom it may concern:*

Be it known that I, BERTRAM MAYER, doctor of philosophy and chemist, a subject of the King of Bavaria, and resident of Basel, Switzerland, have invented Green Vat Dyestuffs and a Process of Making Same, of which the following is a full, clear, and exact specification.

I have found, that the sulfureted vat dyestuff derived from 2-methylbenzanthrone and described in the U. S. Letters Patent No. 1044797 and No. 927868 can be transformed by its treatment with nitric acid into precious dyestuffs dyeing textile fibers from an alkaline vat pure green to olive tints, while the sulfureted vat dyestuff employed as parent material dyes textile fibers from an alkaline vat bluish green tints.

The following examples illustrate the invention:

Example I: 100 parts of the sulfureted vat dyestuff derived from 2-methylbenzanthrone are dissolved in 4000 parts of sulfuric acid of 94 per cent.; in the solution thus obtained are poured slowly, at the ordinary temperature, 195 parts of a mixture of sulfuric acid and of nitric acid, of 6%, care being taken to stir the solution continually. The mass is further stirred for a certain time and poured afterward on ice and filtered. The paste thus obtained is employed directly for dyeing purposes. In a dry state, the new dyestuff is a dark powder of metallic luster, insoluble in the usual solvents as alcohol, toluene and glacial acetic acid, and dissolving very difficultly in boiling nitrobenzene with a green coloration. In concentrated sulfuric acid and in fuming sulfuric acid it dissolves to solutions of violetish brown to dirty-violet coloration. By heating the dyestuff with an alkaline solution of hydrosulfite a blue vat is obtained from which cotton is dyed very pure and fast green tints.

Example II: 100 parts of the sulfureted vat dyestuff derived from 2-methylbenzanthrone are stirred together with 2000 parts of nitrobenzene and 75 parts of concentrated nitric acid for about 5 hours at the ordinary temperature. The reaction mass is hereafter diluted with alcohol, the dyestuff thus separated dried by suction and washed with alcohol. The product thus obtained constitutes a powder of coppery luster, which dissolves very difficultly in boiling nitrobenzene with a green coloration. It dissolves in concentrated sulfuric acid to a brown-red solution and in fuming sulfuric acid to a dirty-violet solution. With an alkaline solution of hydrosulfite the dyestuff yields a pure blue vat from which cotton is dyed fast olive tints.

What I claim is:

1. The described process for the manufacture of green vat dyestuffs, consisting in treating the known green-blue sulfureted vat dyestuff derived from 2-methylbenzanthrone with nitric acid.

2. As new products, the described green vat dyestuffs obtainable by the action of nitric acid on the known green-blue sulfureted vat dyestuff derived from 2-methylbenzanthrone, which constitute in dry state dark powders of metallic luster, are insoluble in the usual solvents as alcohol, toluene and glacial acetic acid, dissolve very difficultly in boiling nitrobenzene to green solutions, dissolve in concentrated sulfuric acid and in fuming sulfuric acid to solutions of brown to dirty violet coloration and yield with alkaline reducing agents a pure blue vat from which textile fibers are dyed fast green to olive tints.

In witness whereof I have hereunto signed my name this 22d day of May, 1913, in the presence of two subscribing witnesses.

BERTRAM MAYER.

Witnesses:
GEO. GIFFORD,
AMAND RETTERY.